United States Patent
Steinberg et al.

(10) Patent No.: US 6,819,858 B2
(45) Date of Patent: Nov. 16, 2004

(54) FIBER ARRAY WITH V-GROOVE CHIP AND MOUNT

(75) Inventors: Dan A. Steinberg, Blacksburg, VA (US); David W. Sherrer, Blacksburg, VA (US); Mindaugas F. Daurtartas, Blacksburg, VA (US); Robert G. Schinazi, Oceanside, CA (US)

(73) Assignee: Shipley Company, L.L.C., Marlborough, MA (US)

( * ) Notice: Subject to any disclaimer, the term of this patent is extended or adjusted under 35 U.S.C. 154(b) by 314 days.

(21) Appl. No.: 10/037,971

(22) Filed: Oct. 24, 2001

(65) Prior Publication Data

US 2003/0169994 A1 Sep. 11, 2003

(Under 37 CFR 1.47)

Related U.S. Application Data

(60) Provisional application No. 60/243,446, filed on Oct. 26, 2000.

(51) Int. Cl.$^7$ ................................................ G02B 6/36
(52) U.S. Cl. .......................... 385/137; 385/134; 385/65; 385/83
(58) Field of Search .............................. 385/63–87, 137

(56) References Cited

U.S. PATENT DOCUMENTS

| | | | |
|---|---|---|---|
| 3,864,018 A | 2/1975 | Miller | 350/96 |
| 3,871,935 A | 3/1975 | Gloge et al. | 156/158 |
| 3,920,432 A | 11/1975 | Smith | 65/4 |
| 4,029,390 A | 6/1977 | Chinnock et al. | 350/96 |
| 4,116,532 A | 9/1978 | Hubbard et al. | 350/96.21 |
| 4,756,591 A | 7/1988 | Fischer et al. | 350/96.2 |
| 4,818,059 A * | 4/1989 | Kakii et al. | 385/65 |
| 4,921,325 A | 5/1990 | Iri et al. | 350/96.21 |
| 4,973,126 A | 11/1990 | Degani et al. | 350/96.21 |
| 4,998,796 A * | 3/1991 | Bonanni et al. | 385/83 |
| 5,257,334 A * | 10/1993 | Takahashi | 385/65 |
| 5,339,376 A | 8/1994 | Kakii et al. | 385/71 |
| 5,351,328 A | 9/1994 | Kakii et al. | 385/83 |
| 5,420,952 A | 5/1995 | Katsura et al. | 385/80 |
| 5,574,817 A * | 11/1996 | Henson et al. | 385/114 |
| 5,603,870 A | 2/1997 | Roll et al. | 264/1.25 |
| 5,815,621 A * | 9/1998 | Sakai et al. | 385/80 |
| 5,984,534 A | 11/1999 | Elderstig et al. | 385/90 |
| 5,997,990 A | 12/1999 | Kambara et al. | 428/167 |
| 6,027,253 A | 2/2000 | Ota et al. | 385/83 |
| 6,210,047 B1 | 4/2001 | Grois et al. | 385/83 |
| 6,215,946 B1 | 4/2001 | Sherrer | |
| 6,363,201 B2 | 3/2002 | Sherrer et al. | |
| 6,474,878 B1 * | 11/2002 | Demangone | 385/78 |
| 6,526,204 B1 | 2/2003 | Sherrer et al. | |

FOREIGN PATENT DOCUMENTS

| | | | | | |
|---|---|---|---|---|---|
| JP | 02272506 A | * | 11/1990 | | G02B/6/255 |
| JP | 03061916 A | * | 3/1991 | | G02B/6/36 |
| JP | 04043308 A | * | 2/1992 | | G02B/6/36 |
| JP | 06027343 A | * | 2/1994 | | G02B/6/24 |
| JP | 08054519 A | * | 2/1996 | | G02B/6/00 |
| JP | 10048477 A | * | 2/1998 | | G02B/6/40 |

* cited by examiner

Primary Examiner—John D. Lee
Assistant Examiner—Scott Alan Knauss
(74) Attorney, Agent, or Firm—Johnthan D. Baskin

(57) ABSTRACT

A molded mount of non-crystalline polymer material is configured to have a channel for retaining a silicon chip having a plurality of juxtaposed V-groove formed in a top surface between right and left side portions, thereof, a recessed area being provided in the channel behind the chip for accommodating fiber buffer coating, and a notch being formed in a top portion of the mount between the channel and one side portion thereof, for retaining strengthening fibers of an optical fiber cable, with the V-groove being configured to receive individual optical fibers therein respectively. Two such molded mounts with silicon chips are securely sandwiched together with V-groove of the chips opposing one another to retain optical fibers therebetween.

20 Claims, 10 Drawing Sheets

FIBER ARRAY WITH V-GROOVE CHIP AND MOUNT

RELATED APPLICATIONS

This Application is related to, and takes priority from, U.S. Provisional Application No. 60/243,446, filed Oct. 26, 2000, for "A Fiber Array With V-Groove Chip and Mount." The present Application is co-pending with the aforesaid Provisional Application, and is owned by a common Assignee.

FIELD OF THE INVENTION

The field of the present invention relates generally to optical fiber connectors, for connecting together optical fibers of optical fiber cables to one another, and to various devices, and more particularly relates to fiber arrays for holding or retaining optical fibers in V-groove formed in a semiconductor substrate.

BACKGROUND OF THE INVENTION

It is known in the prior art to provide a fiber array for holding optical fibers within a semiconductor substrate that has V-groove formed in a portion thereof for retaining optical fibers in very precise alignment relative to the longitudinal axis of the substrate.

FIG. 1 shows a typical semiconductor substrate 1, having a plurality of V-groove 3 formed in one portion thereof for retaining uncoated optical fibers (not shown). The fibers are sometimes mechanically secured within the grooves by means not shown, or secured in the grooves 3 through use of an appropriate adhesive. The substrate 1 shown in FIG. 1 also includes a recessed portion 5, in this example, that may be used for receiving a buffer coating for the associated optical fibers. The substrate 1 typically consists of silicon. A problem in the prior art is that a fiber array chip 7, configured as shown in FIG. 1, and consisting of silicon is very expensive. Accordingly, in order to reduce the cost of such a fiber array chip 7, it is desirable to reduce to the greatest extent possible the amount of silicon material that must be used.

SUMMARY OF THE INVENTION

In one embodiment of the invention, a relatively small substrate of silicon material has a plurality of V-groove formed across its top face for providing the necessary retention of optical fibers therein for a typical fiber array. The V-groove silicon chip is then secured within an open channel or slotway of a plastic or ceramic mount, that is molded or otherwise formed to provide other necessary mechanical aspects of the fiber array, such as a recessed area adjacent the silicon chip for receiving a buffer coating for the optical fibers, as previously described. Any other required mechanical features can be readily formed in the mount. The V-groove silicon chip can either be secured within the channel of a previously molded mount, or the chip can be placed into mold, for permitting the mount to be molded about the silicon chip during formation of the mount. When the silicon chip is inserted into the channel of the mount after the mount is formed, an appropriate adhesive can be used for rigidly securing the two together. The silicon V-groove chip provides precisely dimensioned and aligned V-groove that cannot otherwise be provided by molding of plastic or ceramic materials, for example. The molded mount provides mechanical features that do not require accurate mechanical sizing, location, and alignment, thereby eliminating the need for using silicon material to provide such other features.

In another embodiment of the invention, the silicon V-groove chip, and molded mount, are formed to provide for joining or interlocking the two together through means of dovetails.

In a third embodiment of the invention, two molded mounts each with a silicon V-groove chip retained therein are sandwiched together with respective V-groove opposing one another for retaining optical fibers therebetween.

In a fourth embodiment of the invention, the molded mounts are provided with means for interlocking the pair of molded mounts with silicon V-groove chips, respectively, in a sandwiched configuration that is securely locked together.

In other embodiments of the invention, the dovetailed interlocking between the V-groove silicon chip and an associated molded mount can include interior corners having non-acute angles. Also, the pair of molded mounts sandwiched together with their respective silicon V-groove chips may include relief pockets in one of the mounts opposing ultrasonic energy directors in the other molded mount to which it is to be mounted, for permitting ultrasonic welding to be used for holding the two together in the sandwiched configuration.

In another embodiment, the silicon V-groove chip may include a transverse trench or slotway in a bottom face, with the top face containing the V-groove, whereby the slotway is filled with the same material used to provide the molded mount, for substantially reducing sliding of the silicon chip within the molded mount.

In yet another embodiment of the invention, a front face of the molded mount is provided with vertically oriented grooves for controlling the wicking of glue, and to also provide a surface area for enhancing the bonding of the glue.

In another embodiment of the invention, the V-groove chip is mounted to extend from the molded mount a sufficient amount to permit reliable and optimal contact between the endfaces of optical fibers to be butt-coupled with the endfaces of optical fibers of an opposing array, for example, with the optical fibers each being retained in an associated V-groove.

In another embodiment of the invention, a strain relief is formed to extend from the rear portion adjacent the recessed area of the molded mount. The strain relief provides for reducing strain upon the optical fibers retained in the associated V-groove of the silicon chip.

In another embodiment of the invention, a notch is formed on a top portion of the molded mount extending from the recessed area thereof, for receiving strengthening fibers typically used in optical fiber cables, to enhance the bonding between an associated optical fiber cable and the molded mount.

BRIEF DESCRIPTION OF THE DRAWINGS

Various embodiments of the present invention are described below with reference to the drawings, in which like items are identified by the same reference designation, wherein.

DETAILED DESCRIPTION OF THE INVENTION

Figure 1:
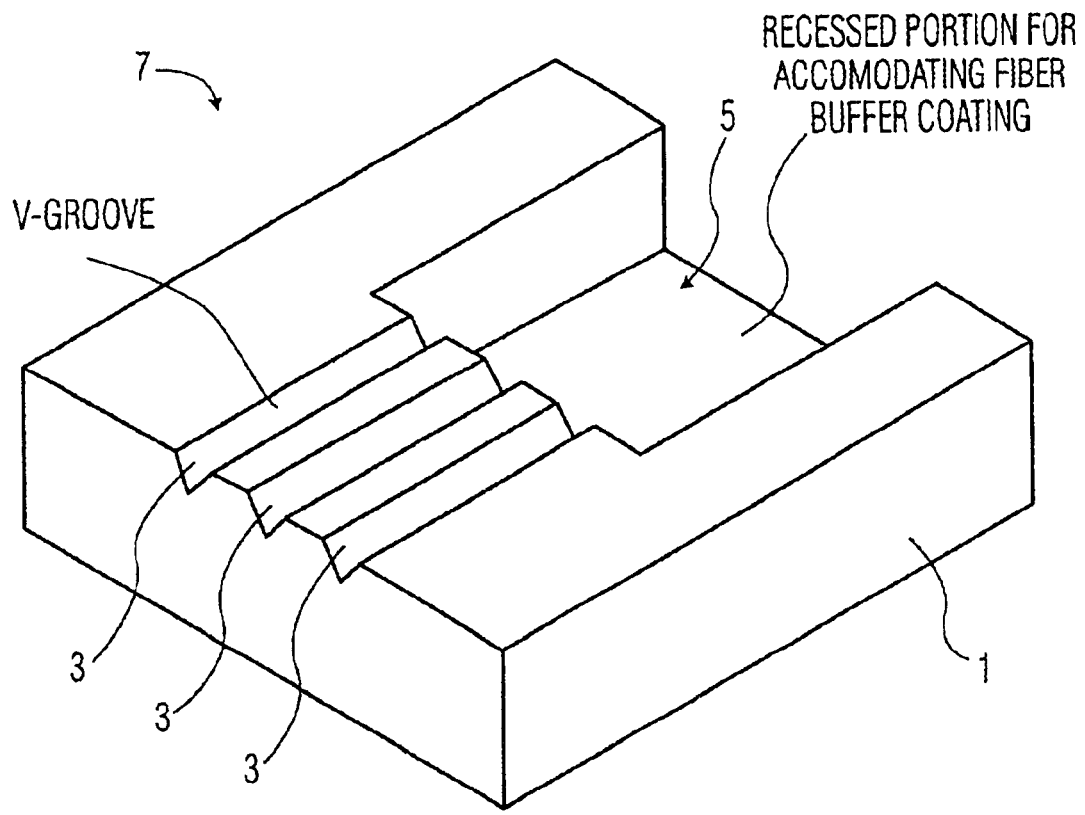
FIG. 1 is a pictorial view of a silicon V-groove chip of the prior art useful for optical fiber arrays.

FIG. 1 shows a typical optical fiber array of the prior art for retaining optical fibers (not shown) in V-groove 3 formed in a silicon substrate 1. As previously explained, the fiber array chip 7 typically includes a recessed portion 5 for accommodating fiber buffer coating material. A major problem with this configuration is that it is expensive to produce because of the large amounts of silicon required. Note that truncated V-grooves, known in the art as "U-grooves" may also be used to fabricate fiber arrays. V-grooves and U-grooves can be made by potassium hydroxide etching of (100) silicon, as is well known in the art.

Figure 2:
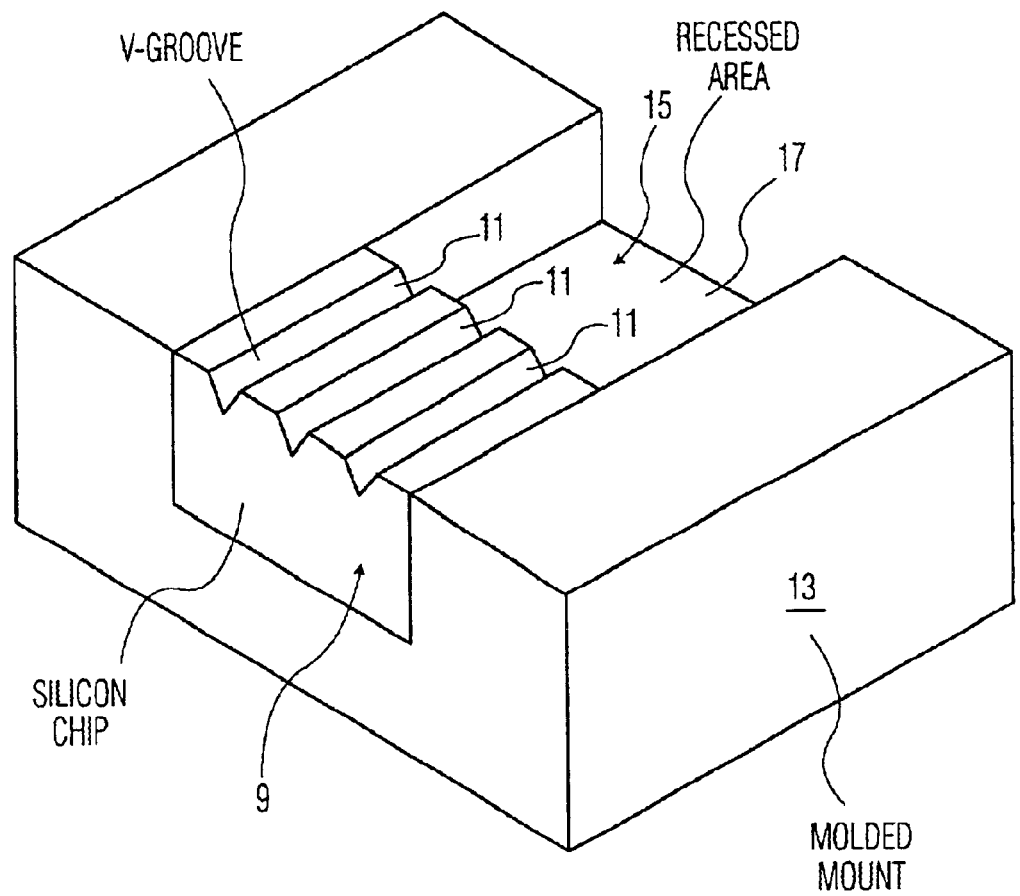
FIG. 2 is a pictorial view of a first embodiment of the invention showing a relatively small silicon chip limited to only providing V-groove, and retained within a molded mount of plastic or ceramic material.

In a first embodiment of the invention as shown in FIG. 2, a small silicon chip 9 (relative to the fiber array chip 7) (see FIG. 1) is provided with a plurality of V-groove 11. The V-groove chip 9 requires substantially less silicon than the fiber array chip 7, by eliminating the latters recessed portion 5, and substantial side portions. The eliminated silicon portions relative to the fiber array chip 7, have been replaced by a mount 13 that consists of plastic or ceramic material. An open channel or slotway 15 is formed in the mount 13 on a top surface thereof. The channel 15 is dimensioned to permit the silicon chip 9 to be snugly mounted therein, and secured by an appropriate adhesive, in one embodiment of the invention. Alternatively, the silicon chip 9 can be placed into an insert mold prior to forming the molded mount 13, and the material of the molded mount 13 can be formed around the silicon chip 9 as the entire molded mount 13 itself is formed. The portion of the channel 15 not occupied by the silicon chip 9 provides a recessed area 17, that functions identically as the recessed area 5 of the silicon substrate 1 of FIG. 1. The molded mount 13 is relatively inexpensive to produce, compared to the fiber array chip 7 of FIG. 1, and does not require the precise dimensioning and alignment of the V-groove 11 of silicon chip 9, or V-groove 3 of the fiber array chip 7. Through use of the molded mount 13, the silicon chip 9 is substantially smaller than the silicon chip 7, thereby providing substantial cost savings from the reduced amount of silicon. Also, reduced manufacturing costs are provided relative to the prior art, by the ease of molding mount 13, and the lack of any requirement for providing the precise dimensioning and alignment of the various features thereof, as with the V-groove 11 of the associated silicon chip 9.

Insert molding techniques known in the art can be used to first insert the silicon chip 9 into a die configured for making the molded mount 13. Thereafter, the desired material for the mount 13 is injected into the associated mold, and permitted to flow around the silicon chip 9, whereafter the material is permitted to solidify. Alternatively, the silicon chip 9 can be pressed or glued into the channel 15 of the molded mount 13. Examples of material applicable for use in providing the molded mount 13 is ABS plastic, ULTEM, or any other moldable polymer. In one aspect of the invention, the moldable polymer is noncrystalline. In another aspect of the invention, the moldable polymer is a thermoset that forms a polymer upon cure, such as epoxies and the like.

Figure 3:
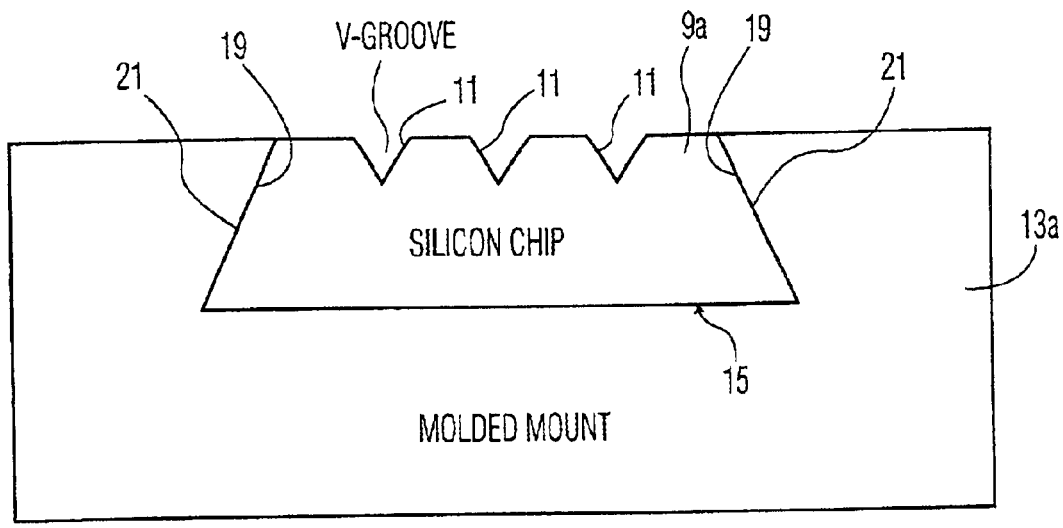
FIG. 3 shows a front elevational view of a relatively small silicon chip having only V-groove, and formed to have angled side edge portions for dovetailed interlocking in a molded mount, for another embodiment of the invention.

In a preferred embodiment of the invention, dovetailing is used to interlock the silicon chip 9a into a compatibly modified molded mount 13a, as shown in FIG. 3. As shown, to provide the dovetail interlocking feature, the side or edge portions 19 of the silicon chip 9a have an acute angle with the bottom thereof. The sidewall portions 21 of the channel or slotway 15 are correspondingly angled inward, as shown.

Figure 4:
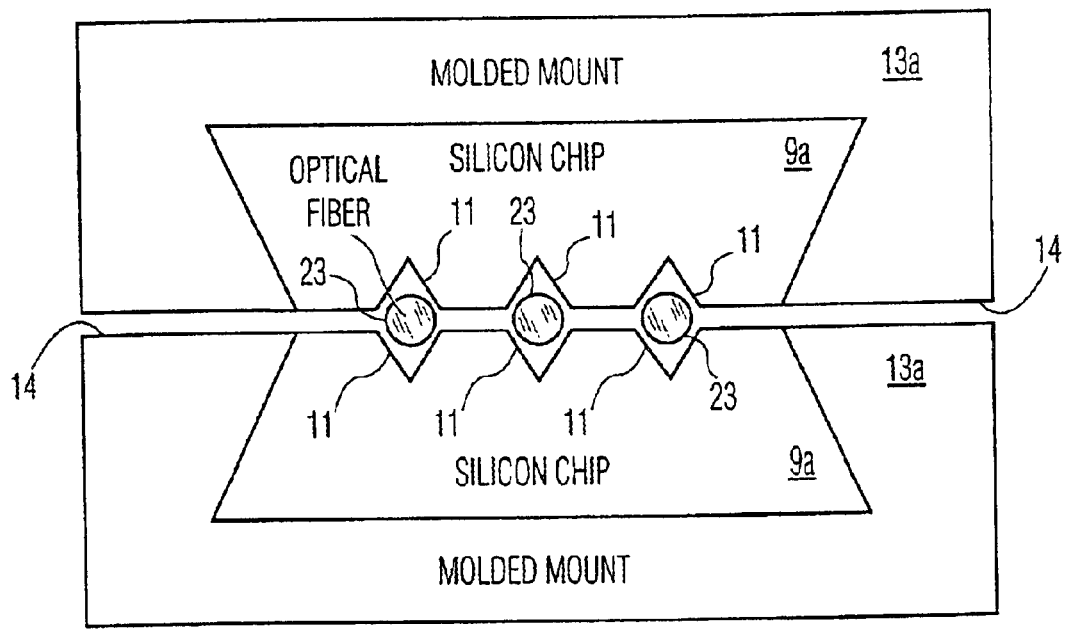
FIG. 4 is a front elevational view of two molded mounts each with a dovetailed silicon chip, with respective V-groove opposing one another for retaining optical fibers therebetween for another embodiment of the invention.

In FIG. 4, two loaded mounts 13a, with the respective silicon chips 9a, are assembled together with their respective top faces 14 opposing one another, for securing optical fibers 23 within the opposing V-groove 11, as shown. In a preferred embodiment of the invention shown in FIG. 5, rather than or in addition to using adhesives for securing the mounts 13a together, interlocking pawls 25 are provided on one side portion of the top faces 27 thereof, as shown. However, adhesives will likely be necessary even if pawls 25 are used. On the opposite ends of the top faces 27 of the molded mounts 13a, keyways 29 are provided as shown, for respectively receiving a pawl 25.

Figure 5:
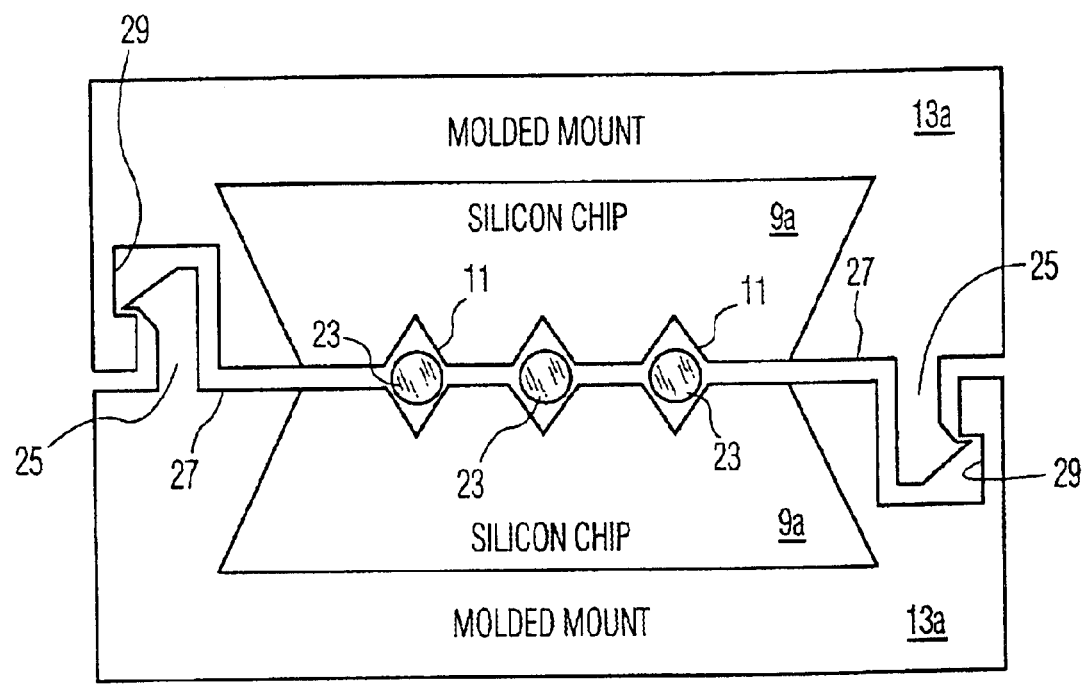
FIG. 5 is a front elevational view showing first interlocking means for securing or locking together two molded mounts each with dovetailed silicon chips, in yet another embodiment of the invention.
Figure 6:
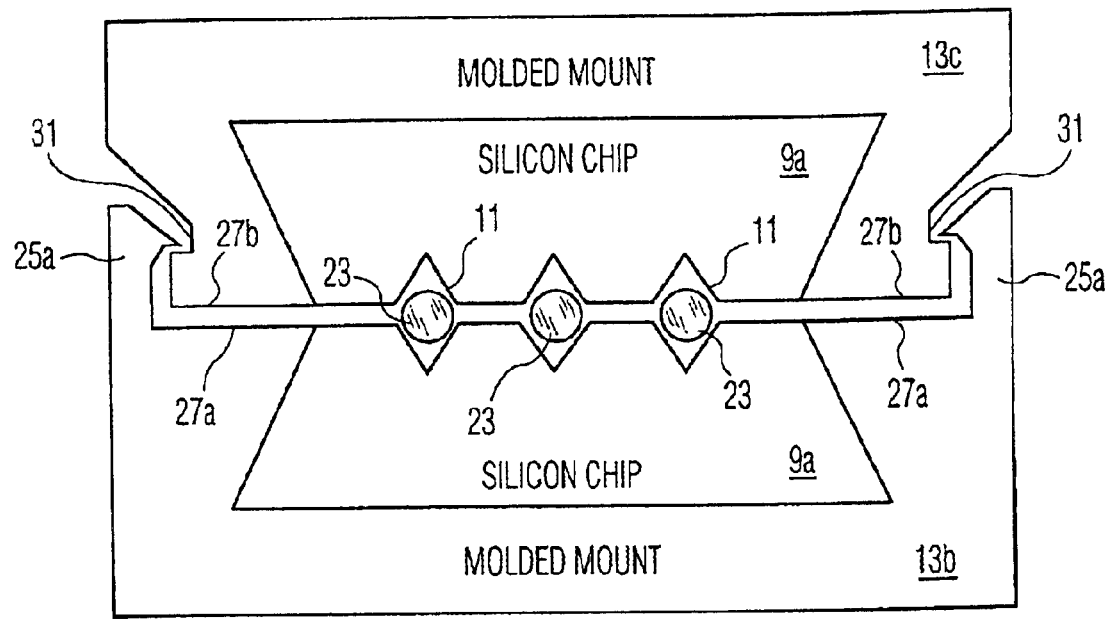
FIG. 6 is a front elevational view of another embodiment of the invention using alternative locking means relative to the locking means of FIG. 5.

In another embodiment of the invention, an alternative locking mechanism is employed in FIG. 6. In this embodiment, a molded mount 13b is configured to have locking pawls 25a protruding from the ends of its top face 27a, as shown. Another molded mount 13c is configured to have angulated L-shaped notches 31 cut into a lower portion of each side thereof near a top face 27b, as shown. In the embodiments of FIGS. 5 and 6, a user first places optical fibers 23 in the V-groove 11 of one of the molded mounts of 13a, or 13b, respectively. Next, a mating molded mount 13a or 13c, respectively, is then positioned as shown in FIG. 5 or 6, respectively, and pushed toward its mating molded mount to cause the pawls 25 to snap into and engage the keyways 29, or pawls 25a and engage the notches 31, respectively, as shown.

Figure 7:
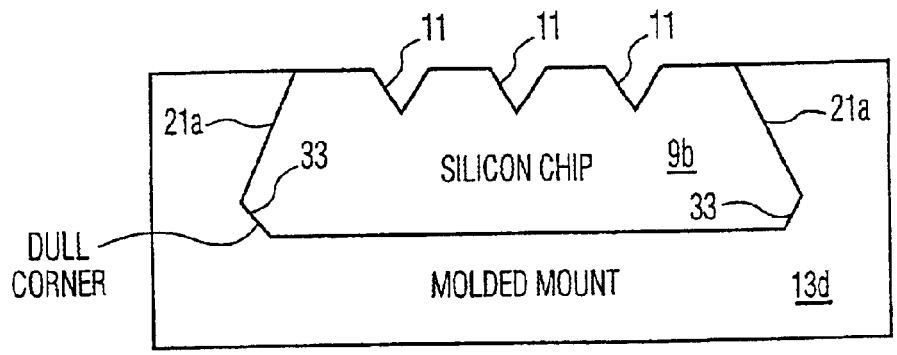
FIG. 7 shows a front elevational view of another embodiment of the invention providing non-acute angles for the dovetailed interlocking configuration between a molded mount and a silicon V-groove chip.

In a preferred embodiment of the invention, as shown in FIG. 7, the silicon chip 9b has a dovetailed configuration having corners 33 with non-acute angles, as shown, to provide a re-entrant shape. Note that the bottom of the chip 9b is wider than its top. The structural integrity of the molded mount 13d might otherwise be impaired if sharp corners are used. The side walls 21a of the corresponding slotway or channel of the molded mount 13d are configured to have the same configuration as the silicon chip 9b sidewalls, for mating therewith, as shown.

Figure 8:
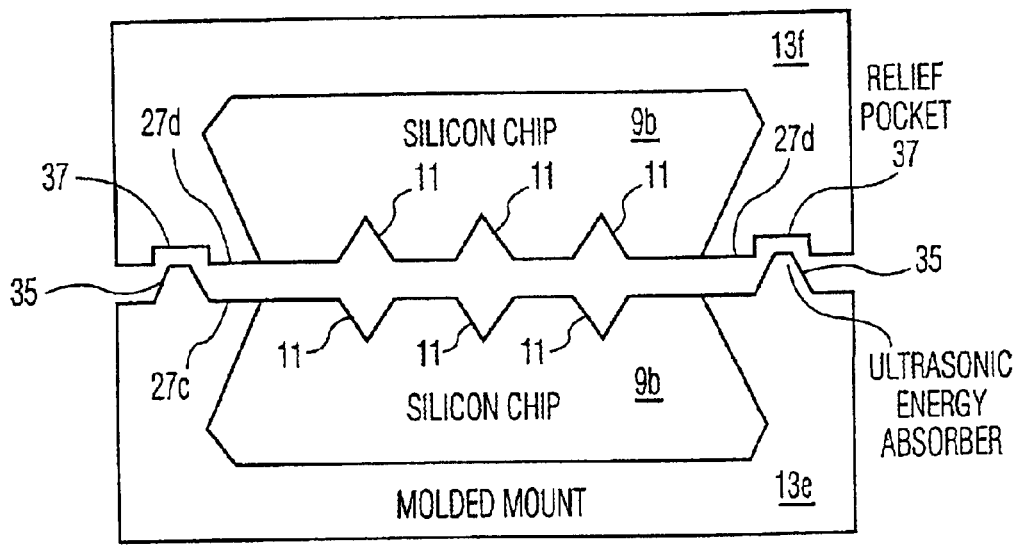
FIG. 8 shows a front elevational view of another embodiment of the invention for rigidly securing two molded mounts each with silicon chips, with associated V-grooves opposing one another, whereby relief pockets are provided in one of the molded mounts for ultrasonic welding to ultrasonic energy directors of the other molded mount.

In another preferred embodiment of the invention, as shown in FIG. 8, a molded mount 13e is provided with ultrasonic energy absorbers 35 that are small bumps of plastic near the sidewall edges of the top face 27c thereof, that provide material that acts as an adhesive via ultrasonic welding. A molded mount 13f positioned for having its V-groove 11 opposing the V-groove 11 of the molded mount 13e, is provided with relief pockets 37 in its top face 27d near its side portions, as shown. When the molded mounts 13e and 13f are positioned as shown for retaining optical fibers in the respective V-groove 11, the mounts are moved together for permitting ultrasonic welding of the energy absorbers 35 with the relief pockets 37, whereby the energy directors 35 mold into the relief pockets 37 forming a rigid securement of the molded mounts 13e and 13f to one another.

Figure 9A:
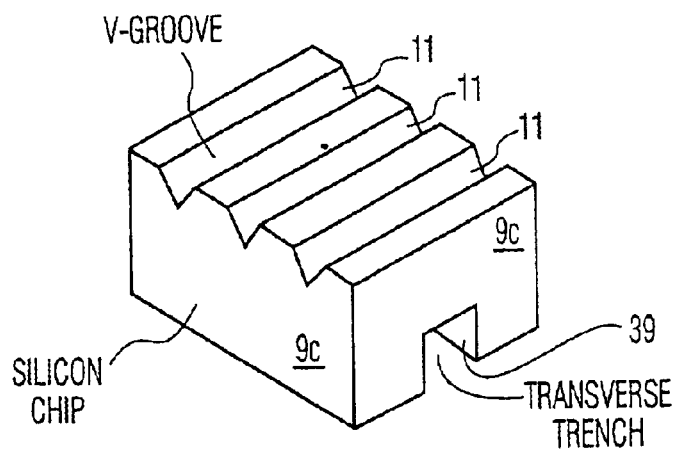
FIG. 9A shows a pictorial view of another embodiment of the invention that includes a transverse slotway or trench in a bottom face of a silicon chip having V-grooves formed on its top face.
Figure 9B:
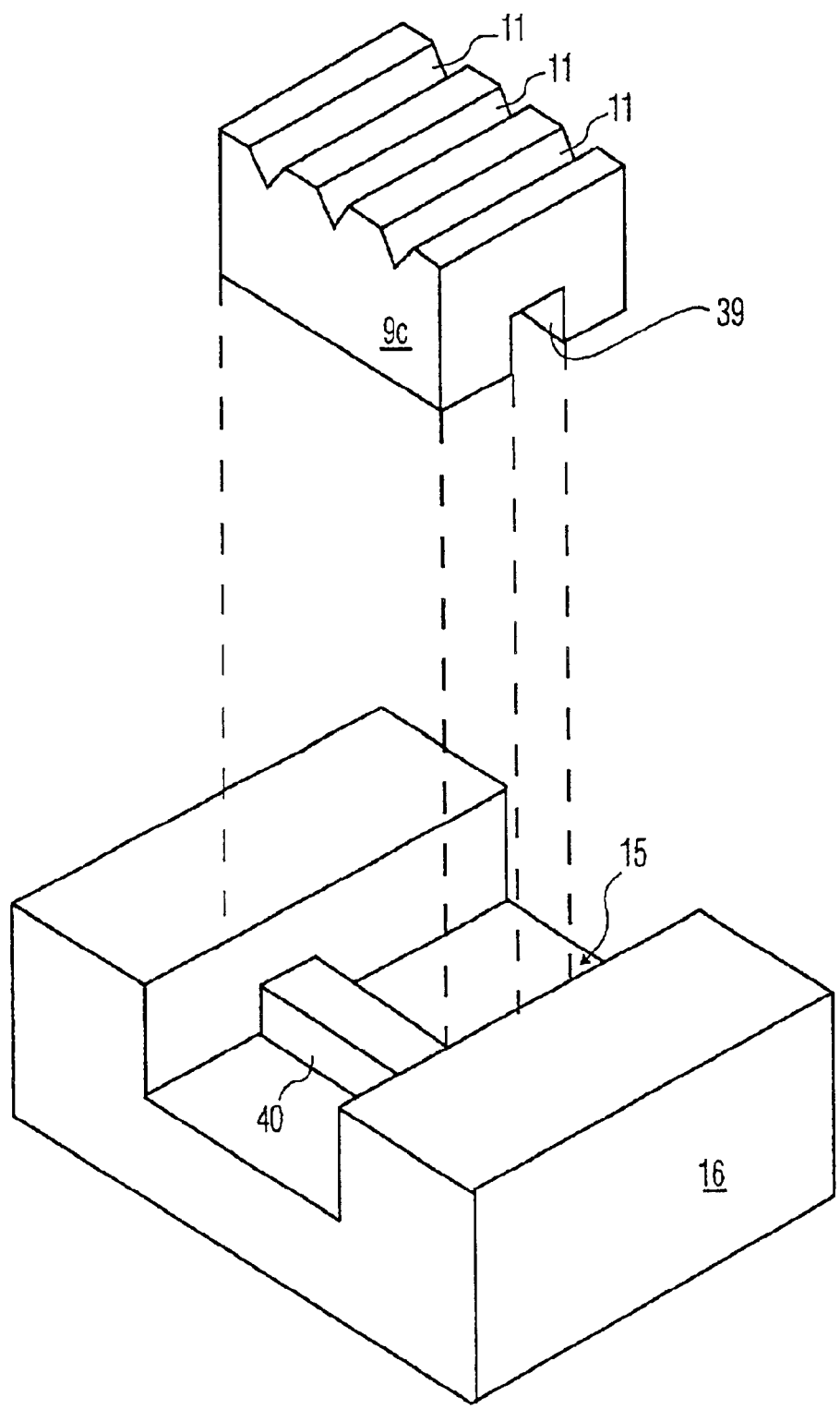
FIG. 9B shows a pictorial exploded assembly diagram of the chip of FIG. 9A oriented for insertion into the channel of a molded mount.

In another preferred embodiment of the invention shown in FIG. 9A, a silicon chip 9c is provided with a transverse trench or slotway 39 for helping to ensure that the silicon chip 9c is locked into an associated molded mount. More specifically, during molding of the mount about silicon chip 9C, the trench 39 is filled with the same material that the associated molded mount is made from, whereby this will substantially prevent the silicon chip 9c from sliding longitudinally within its associated mount. Alternatively, the associated molded mount can be formed as shown in FIG. 9B with a transverse stepped portion 40 in its slotway 15 for mating with the trench 39 of the silicon chip 9c, thereby also preventing longitudinal movement of the chip 9c therein.

Figure 10:
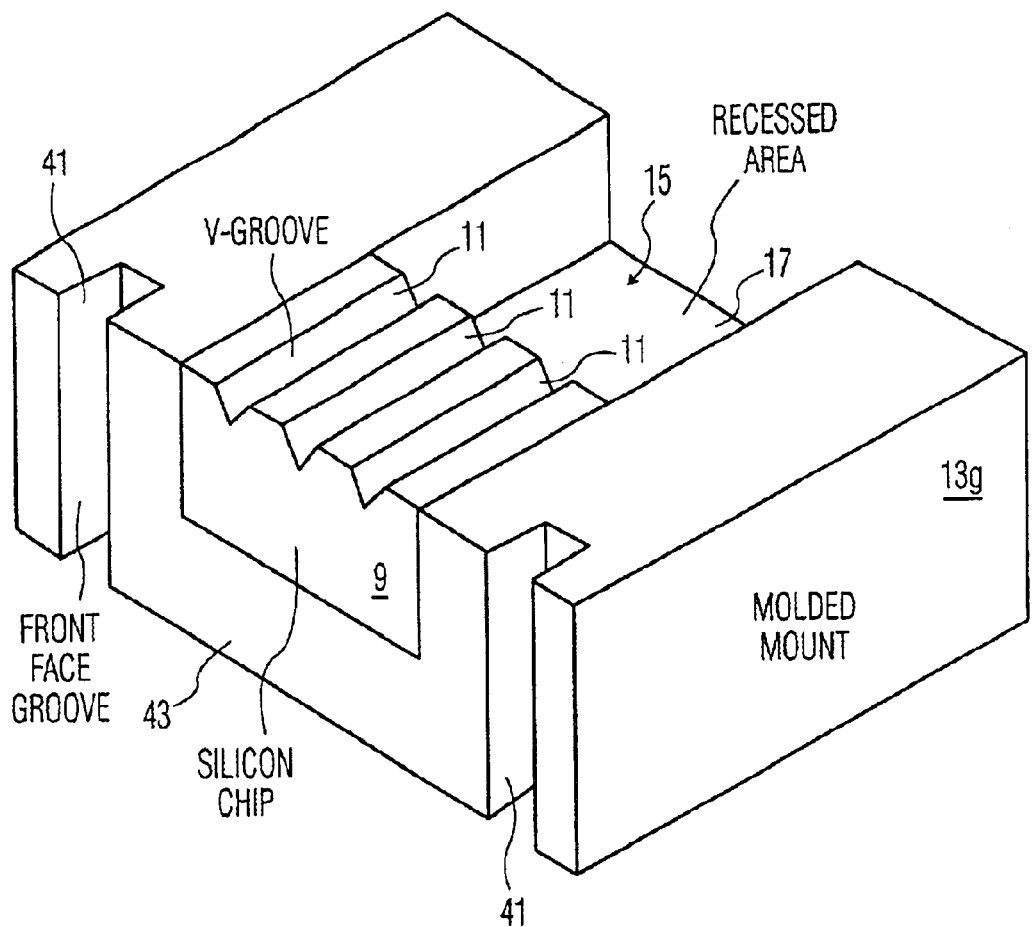
FIG. 10 shows a pictorial view of another embodiment of the invention for providing vertically oriented front face grooves in a molded mount carrying a Silicon V-groove Chip, whereby the grooves provide both control over the wicking of glue, and enhanced bonding thereof.

In another preferred embodiment of the invention, as shown in FIG. 10, a molded mount 13g is provided with vertical grooves 41 in its front face 43, as shown. The grooves 41 provide control over the wicking of adhesive or glue, and also provide a greater surface area for bonding of glue, for securing the molded mount 13g to similar or other fiber optic devices.

Figure 11:
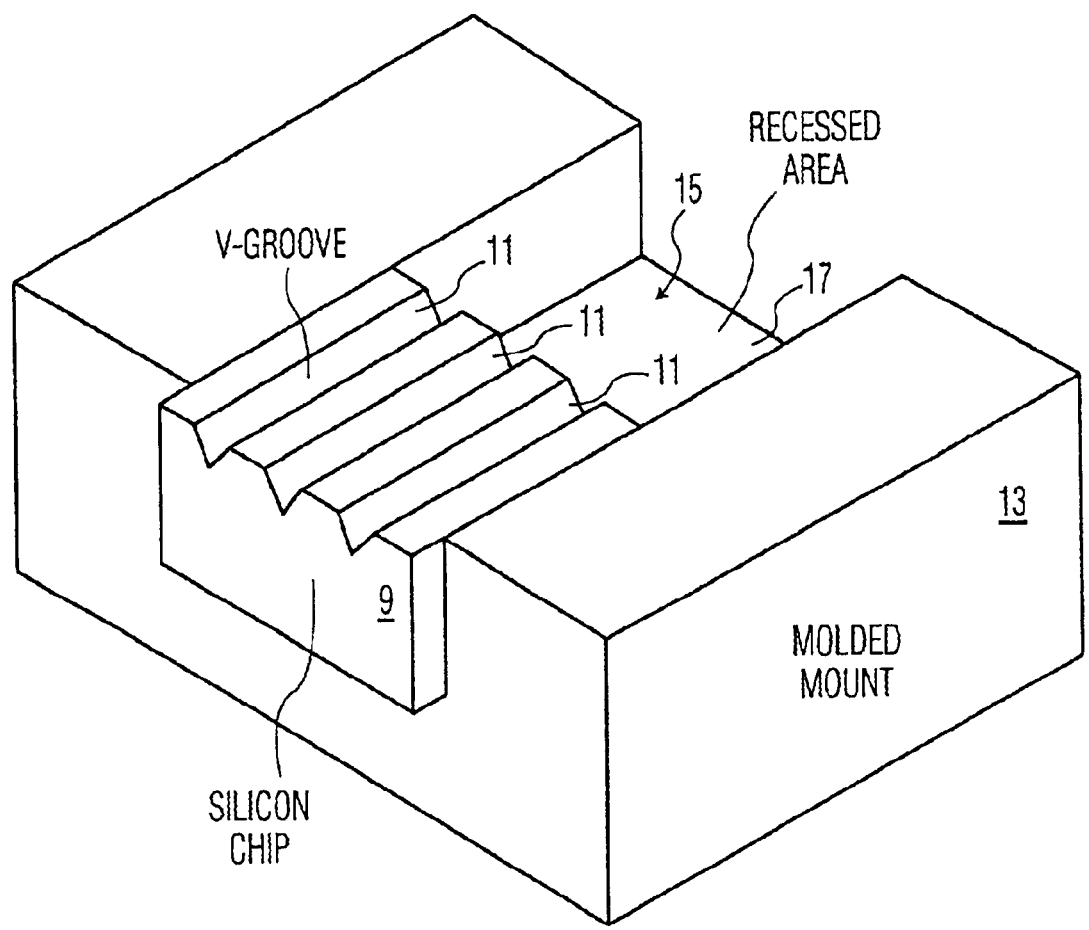
FIG. 11 shows a pictorial view of another embodiment of the invention in which a Silicon V-groove Chip extends away from its associated molded mount a sufficient distance to facilitate butt-coupling between the endfaces of optical fibers retained in the associated V-groove, and the endfaces of optical fibers external to the associated silicon chip and its molded mount.

In another preferred embodiment of the invention, the silicon chip 9 is positioned to extend from its associated molded mount 13, as shown in FIG. 11. In this manner, the Silicon V-groove Chip 9, by extending by about 10 to 100 microns, for example, facilitates coupling of the endfaces of optical fibers carried in the V-groove 11 with the endfaces of optical fibers carried in another optical fiber array. In this manner, the molded mount 13 is less likely to interfere with contact between butt-coupled optical fibers, thereby ensuring optimal coupling.

Figure 12:
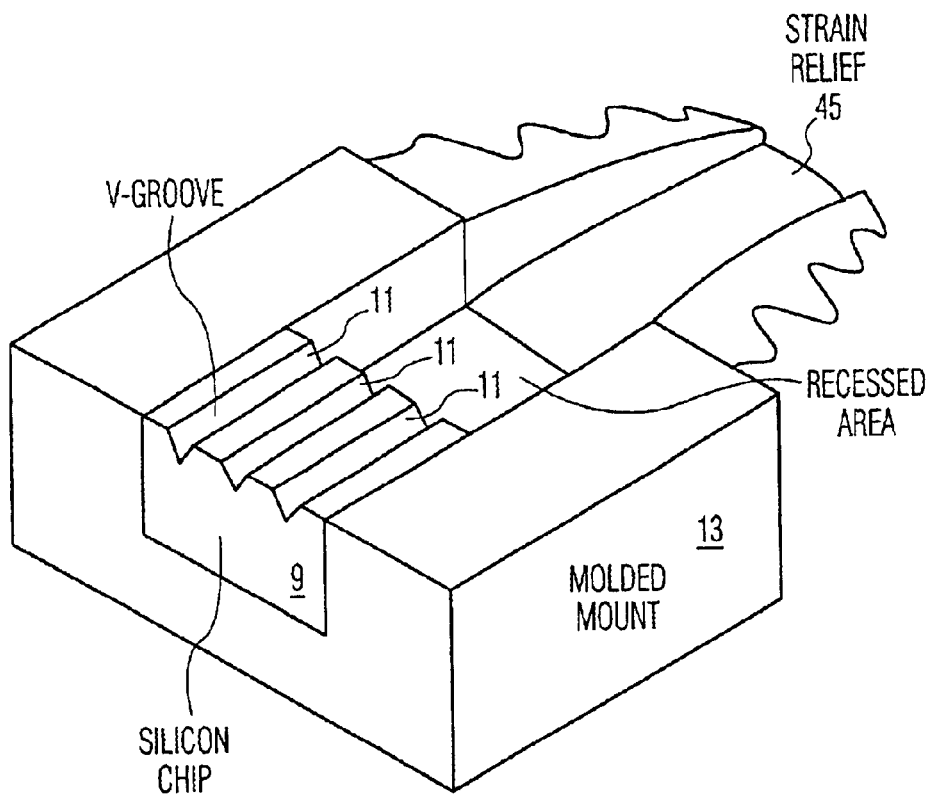
FIG. 12 is a pictorial view of another embodiment of the invention for including a strain relief extending from a back surface of a molded mount carrying a Silicon V-groove Chip.

In yet another preferred embodiment of the invention, as shown in FIG. 12, a molded mount 13 carrying a V-groove silicon chip 9, is provided with a strain relief 45 extending from the rear or back portion of mount 13. The strain relief 45 reduces the strain imposed upon optical fibers located in the V-groove 11, thereby reducing the chance of damaging the optical fibers. The strain relief 45 can be made using known molding techniques. For example, it can be made through use of a "two-shot mold", which requires two molding steps. In this manner, the strain relief 45 can made of material different from that of the molded mount 13. Alternatively, a single mold can be used if the strain relief 45 consists of the same material as the molded mount 13.

Note that when optical fibers are bonded to V-groove 11 of the Silicon V-groove Chips of the various embodiments of the invention described above, it is preferred that an elastomeric adhesive be used to provide the bond in the strain relief 45 portion of the package. This is sometimes necessated by recognition that the material of the various molded mounts typically have a thermal expansion co-efficient substantially greater (e.g. 10 times greater) than the optical fibers or the silicon chips. If the glue utilized is a rigid glue (e.g. epoxy), the thermal expansion of the molded mount material may cause associated optical fibers to be pulled away from their associated V-groove silicon chip. However, if an elastomeric adhesive is used, the adhesive will deform so that the optical fibers will stay fixed within the V-groove of their associated silicon chip. In practice, the optical fibers are preferably bonded to their associated V-groove silicon chip to provide a rigid bond (e.g. with a epoxy, aluminum-oxide bonding, spin-on glass, solder, and so forth).

Figure 13:
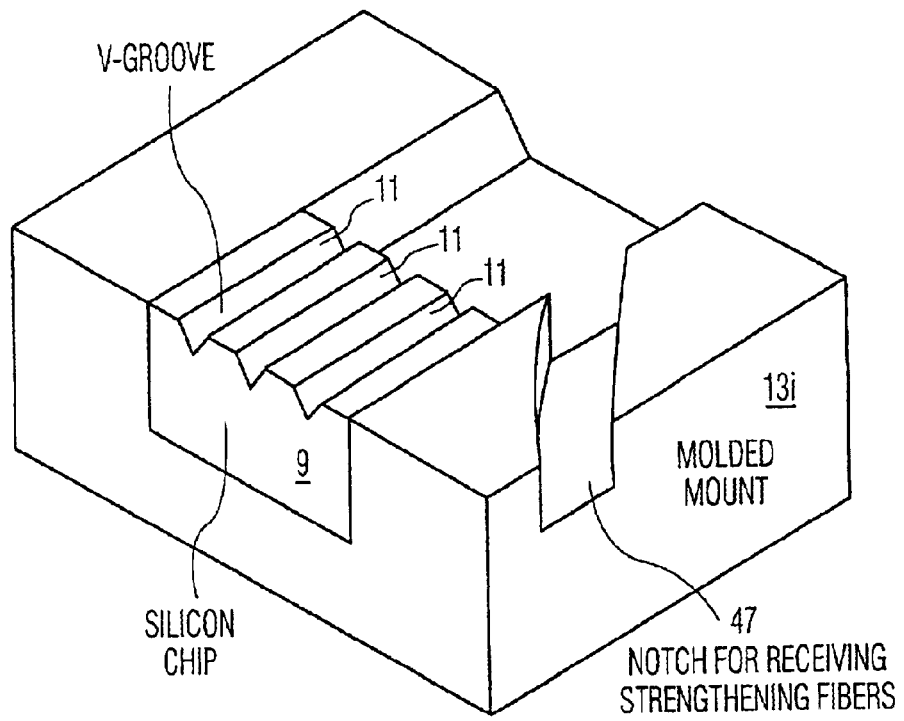
FIG. 13 is a pictorial view of another embodiment of the invention showing a molded mount carrying a Silicon V-groove Chip, with the molded mount including a notch formed into a top surface thereof for receiving strengthening fibers from an optical fiber cable.
Figure 14:
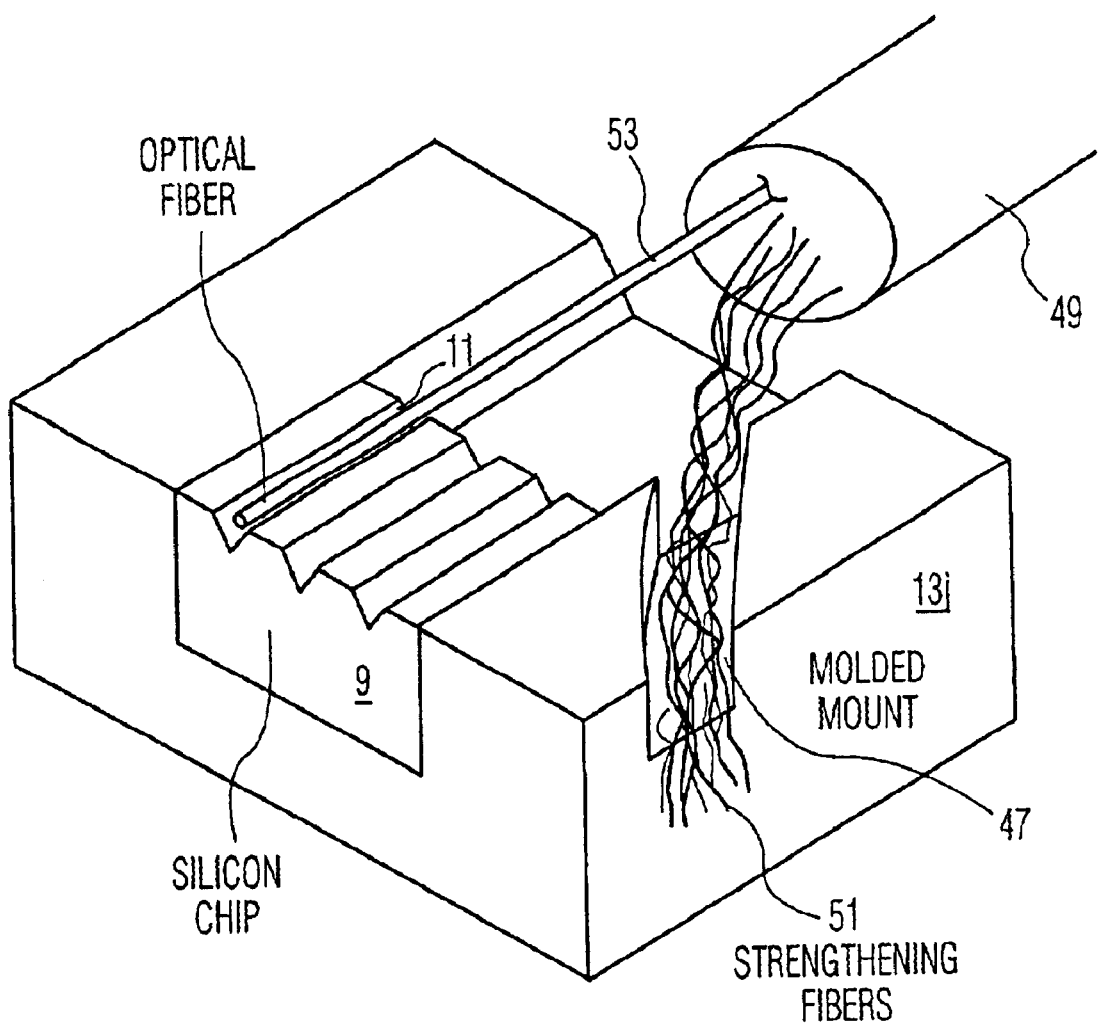
FIG. 14 shows a pictorial view of the embodiment of FIG. 13, in association with an optical fiber cable having strengthening fibers, and an optical fiber therefrom installed in a V-groove of the associated silicon chip, and the notch of the molded mount, respectively.

Another embodiment of the invention is shown in FIG. 13, for providing a molded mount 13i with a notch 47 in a top portion thereof, as shown. The notch 47 is provided for receiving strengthening fibers (e.g. nylon, kevlar, metal) typically used in optical fiber cables. Through use of the notch 47 bonded to the strengthening fibers, an improved bonding between the optical fiber cable and the molded mount 13i is provided. FIG. 14 shows an optical fiber cable 49 having strengthening fibers 51 secured with glue (not shown) in the notch 47, as shown. An optical fiber 53 from the cable 49 is shown installed in a V-groove 11 of the silicon chip 9, as shown.

Although various embodiments of the invention have been shown and described, they are not meant to be limiting. Those of skill in the art may recognize certain modifications thereto, which modifications are meant to be covered by the spirit and scope of the depended claims.

What is claimed is:

1. A fiber array device for retaining one or more optical fibers, comprising:
   a chip comprising a main surface, a front face, a back face, and at least one groove in the main surface for holding an optical fiber, the groove extending from the front face toward the back face; and
   a molded mount formed of a polymer for holding the chip, the mount comprising a channel for receiving the chip;
   wherein the chip is rigidly secured within the channel, and the channel is configured such that the front face and the main surface of the chip are exposed, and wherein the channel is longer than the chip, thereby providing a recessed area behind the chip, and wherein the chip and the mount are configured for providing a press fit and frictional securement therebetween.

2. The fiber array device of claim 1, wherein the chip is adhesively secured to the mount.

3. The fiber array device of claim 1, wherein the mount is molded to the chip.

4. The fiber array device of claim 1, wherein the main surface of the chip lies in the same plane as a surface of the mount in which the channel is formed.

5. The fiber array device of claim 1, wherein the polymer is noncrystalline.

6. The fiber array device of claim 1, wherein the chip is formed of single crystal silicon.

7. The fiber array device of claim 1, wherein the front face of the chip extends beyond a front face of the mount a length of up to 100 micrometers.

8. The fiber array device of claim 1, further comprising a strain relief extending from a back portion of the mount.

9. A fiber array device for retaining one or more optical fibers, comprising:

a chip comprising a main surface, a front face, a back face, at least one groove in the main surface for holding an optical fiber, the groove extending from the front face toward the back face, and in a surface opposite the main surface, a slot transverse to the at least one groove; and a molded mount formed of a polymer for holding the chip, the mount comprising a channel for receiving the chip and a transverse stepped portion in the channel for mating with the transverse slot of the chip;

wherein the chip is rigidly secured within the channel, and the channel is configured such that the front face end the main surface of the chip are exposed.

10. A fiber array device for retaining one or more optical fibers, comprising:

a chip comprising a main surface, a front face, a back face, and at least one groove in the main surface for holding an optical fiber, the groove extending from the front face toward the back face; and a molded mount formed of a polymer for holding the chip, the mount comprising a channel for receiving the chip, and a plurality of grooves in a front face of the mount at opposite ends thereof; wherein the grooves run perpendicular to the main surface of the chip and are effective to control wicking of adhesive;

wherein the chip is rigidly secured within the channels, and the channel is configured such that the front face and the main surface of the chip are exposed.

11. A fiber array device for retaining one or more optical fibers, comprising:

a chip comprising a main surface, a front face, a back face, and at least one groove in the main surface for holding an optical fiber, the groove extending from the front face toward the back face; and a molded mount formed of a polymer for holding the chip, the mount comprising a channel for receiving the chip and an open notch formed from the channel through a side portion thereof, for receiving strengthening fibers of an associated optical fiber cable;

wherein the chip is rigidly secured within the channel, and the channel is configured such that the front face and the main surface of the chip arc exposed.

12. The fiber array device of claim 11, further comprising an optical fiber cable comprising strengthening fibers which are disposed in the open notch.

13. A fiber array for retaining one or more optical fibers, comprising:

first and second chips each comprising a main surface, a front face, a back face, and at least one groove in the main surface for holding an optical fiber, the groove extending from the front face toward the back face; and first and second molded mounts formed of a polymer for holding a first and second chip, respectively, the mounts each comprising a channel for receiving the respective chip, wherein the channel is longer than the respective chip, thereby providing a recessed area behind the respective chip;

wherein the first and second chips are rigidly secured within the respective channel of the first and second mounts, and the channels are configured such that the front face and the main surface of the first and second chips are exposed; and wherein the main surface and the at least one groove of the first chip faces the main surface and the at least one groove of the second chip.

14. The fiber array of claim 13, wherein the first and second chips each have a re-entrant shape and the channels are each configured to conform to the re-entrant shape for snugly receiving and locking the chips into the channels.

15. The fiber array device of claim 14, wherein interior opposing corner portions of the chip and of the mount are configured to provide the re-entrant shape.

16. The fiber array of claim 13, further comprising adhesive for rigidly securing together the first and second mounts.

17. The fiber array of claim 13, further comprising means for locking the first and second mounts together to cause a compressive force to be applied by the one or more groove in the first mud second chips against one or more optical fibers retained therebetween.

18. The fiber array of claim 17, wherein the means for locking comprises: a locking pawl and a keyway associated with each of the first and second mount;

wherein the locking pawls of the first and second mount are configured to interlock with the keyway of the second and first mount respectively, for retaining the first and second mounts securely together.

19. The fiber array of claim 17, wherein the moans for locking comprises:

first and second locking pawls associated with the first mount; and first and second L-shaped notches in side portions of the second mount;

wherein the first and second locking pawls are configured to lock into the first and second L-shaped notches, respectively, for retaining the first and second mounts securely together.

20. The fiber array device of claim 17, wherein the means for locking comprises an ultrasonically welded joint.

* * * * *